(12) United States Patent
Han et al.

(10) Patent No.: US 10,717,802 B2
(45) Date of Patent: Jul. 21, 2020

(54) METHOD OF PREPARING ABS-BASED RESIN COMPOSITION AND METHOD OF MANUFACTURING ABS-BASED INJECTION-MOLDED ARTICLE INCLUDING THE SAME

(71) Applicant: LG CHEM, LTD., Seoul (KR)

(72) Inventors: Su Jeong Han, Daejeon (KR); Young Min Kim, Daejeon (KR); Jin Hyoung Lee, Daejeon (KR); Yoo Vin Kim, Daejeon (KR); Young Hwan Jeong, Daejeon (KR); Sun Haeng Chung, Daejeon (KR); Jae Min Suk, Daejeon (KR); Jae Won Heo, Daejeon (KR)

(73) Assignee: LG CHEM, LTD., Seoul (KR)

( * ) Notice: Subject to any disclaimer, the term of this patent is extended or adjusted under 35 U.S.C. 154(b) by 248 days.

(21) Appl. No.: 16/068,873

(22) PCT Filed: Aug. 1, 2017

(86) PCT No.: PCT/KR2017/008312
§ 371 (c)(1),
(2) Date: Jul. 9, 2018

(87) PCT Pub. No.: WO2010/084408
PCT Pub. Date: May 11, 2018

(65) Prior Publication Data
US 2019/0016841 A1    Jan. 17, 2019

(30) Foreign Application Priority Data
Nov. 1, 2016 (KR) .................. 10-2016-0144437

(51) Int. Cl.
| | |
|---|---|
| C08F 279/04 | (2006.01) |
| C08L 25/12 | (2006.01) |
| C08F 2/26 | (2006.01) |
| C08L 55/02 | (2006.01) |
| C08F 136/06 | (2006.01) |

(52) U.S. Cl.
CPC .............. *C08F 279/04* (2013.01); *C08F 2/26* (2013.01); *C08L 25/12* (2013.01); *C08L 55/02* (2013.01); *C08F 136/06* (2013.01)

(58) Field of Classification Search
None
See application file for complete search history.

(56) References Cited

FOREIGN PATENT DOCUMENTS

| | | |
|---|---|---|
| CN | 001129719 | 8/1996 |
| CN | 104768988 | 7/2015 |
| CN | 104987775 A | 10/2015 |
| EP | 0714943 A2 | 6/1996 |
| EP | 0714949 A2 | 6/1996 |
| EP | 3363833 A1 | 8/2018 |
| EP | 3385292 A1 | 10/2018 |
| JP | 1996-176351 A | 7/1996 |
| KR | 10-0527095 B1 | 11/2005 |
| KR | 10-0755592 B1 | 9/2007 |
| KR | 10-1223295 B1 | 1/2013 |
| KR | 10-2013-0057139 A | 5/2013 |
| KR | 10-2016-0071250 A | 6/2016 |
| KR | 20160071250 * | 6/2016 |
| KR | 10-1690381 | 12/2016 |
| WO | 2014208965 A1 | 12/2014 |

OTHER PUBLICATIONS

European Search Report for Application No. 17866938.8(PCT/KR2017008312), dated Feb. 22, 2019.
International Search Report for International Patent Application No. PCT/KR2017/008312, dated Dec. 12, 2017.

* cited by examiner

*Primary Examiner* — Nathan T Leong

(57) ABSTRACT

The present invention relates to a method of preparing an ABS-based resin composition and a method of manufacturing an ABS-based injection-molded article including the same. More particularly, the present invention provides a method of preparing an ABS-based resin composition using a multimeric acid of unsaturated fatty acid or a metal salt thereof, as an emulsifier, in a diene-based rubber latex polymerization step and an ABS-based graft polymerization step. In accordance with the present invention, when an ABS-based resin composition is prepared using a multimeric acid of unsaturated fatty acid or a metal salt thereof as an emulsifier, stability of polymerization is secured and surface characteristics, such as surface gloss or sharpness, of an ABS-based injection-molded article are improved.

17 Claims, No Drawings

METHOD OF PREPARING ABS-BASED RESIN COMPOSITION AND METHOD OF MANUFACTURING ABS-BASED INJECTION-MOLDED ARTICLE INCLUDING THE SAME

CROSS-REFERENCE TO RELATED APPLICATION

This application is a U.S. National Stage of International Patent Application No. PCT/KR2017/008312, filed on Aug. 1, 2017, which claims the priority benefit of Korean Patent Application No. 10-2016-0144437, filed on Nov. 1, 2016, in the Korean Intellectual Property Office, the disclosures of which are incorporated herein by reference.

TECHNICAL FIELD

The present invention relates to a method of preparing an ABS-based resin composition and a method of manufacturing an ABS-based injection-molded article including the same. More particularly, the present invention relates to a method of preparing an ABS-based resin composition including a multimeric acid of unsaturated fatty acid or a metal salt thereof, as an emulsifier, in a diene-based rubber latex polymerization step and an ABS-based graft polymerization step to improve surface gloss and sharpness of an ABS-based injection-molded article, and a method of manufacturing an ABS-based injection-molded article including the same.

BACKGROUND ART

An acrylonitrile-butadiene-styrene (ABS) copolymer resin has relatively satisfactory moldability, gloss, and the like as well as mechanical strength such as impact resistance and, accordingly, has been widely applied to electric components, electronic components, office equipment or automobile components, and the like.

When an ABS copolymer resin is prepared by grafting a conjugated diene-based rubber latex onto an aromatic vinyl compound and a vinyl cyan compound monomer by an emulsion polymerization method, more satisfactory property balance, superior gloss, and the like are generally exhibited, compared to that prepared by a bulk polymerization method. Accordingly, an ABS copolymer resin has been generally prepared by an emulsion polymerization method.

In addition, an ABS copolymer resin prepared by an emulsion polymerization method is mixed and processed with a styrene-acrylonitrile copolymer (SAN) to produce a final ABS-based thermoplastic resin composition. Although an ABS-based thermoplastic resin composition prepared by an emulsion polymerization method is advantageous in that it has superior impact resistance, processability, chemical resistance, and the like, properties such as gloss and sharpness have limitations due to use of an emulsifier or a coagulant during preparation of a diene-based rubber latex and an ABS graft copolymer.

RELATED ART DOCUMENT

[Patent Document](Patent Document 1) KR 0527095 B1

DISCLOSURE

Technical Problem

Therefore, the present invention has been made in view of the above problems, and it is one object of the present invention to provide a method of preparing an ABS-based resin composition including a novel emulsifier that is not easily vaporized during a high-temperature thermomolding process, such as extrusion or injection-molding, and thus effectively reduces the amount of gases (Total Volatile Organic Compounds, TVOC) generated on a resin surface to allow production of an ABS-based injection-molded article having superior surface gloss and sharpness.

It is another object of the present invention to provide a method of manufacturing an ABS-based injection-molded article having superior gloss and sharpness by using an ABS-based resin composition according to the method.

The above and other objects can be accomplished by the present disclosure described below.

Technical Solution

In accordance with one aspect of the present invention, provided is a method of preparing an ABS-based resin composition, the method including a) a step of polymerizing 100 parts by weight of a conjugated diene based monomer, 0.5 to 5 parts by weight of an emulsifier, and 0.01 to 6 parts by weight of a water-soluble polymerization initiator; b) a step of adding 0.01 to 5 parts by weight of an emulsifier thereto when a polymerization conversion rate is 60 to 85%, after step a); c) a step of terminating polymerization when a polymerization conversion rate is 90 to 99% to obtain a large-diameter diene-based rubber latex; d) a step of graft-polymerizing 100 parts by weight of a monomer mixture including 40 to 70% by weight (based on solid) of the large-diameter diene-based rubber latex, 15 to 35% by weight of an aromatic vinyl monomer, and 5 to 25% by weight of a vinyl cyan monomer with 0.01 to 3 parts by weight of an emulsifier, 0.01 to 3 parts by weight of an initiator, and 0.001 to 1 parts by weight of an oxidation-reduction catalyst; e) a step of terminating polymerization when a conversion rate of the graft polymerization is 90 to 99% to obtain an ABS-based graft copolymer; and f) a step of mixing the ABS-based graft copolymer and an aromatic vinyl monomer-vinyl cyan monomer copolymer to prepare an ABS-based resin composition, wherein the emulsifiers of steps a) and d) include a multimeric acid of unsaturated fatty acid or a metal salt thereof and the ABS-based resin composition has a gloss (45°) of 90 or more.

In accordance with another aspect of the present invention, provided is a method of manufacturing an ABS-based injection-molded article, the method including a step of injection-molding the ABS-based resin composition prepared according to the method.

Advantageous Effects

As apparent from the fore-going, when an ABS-based resin composition is prepared using an emulsifier including a multimeric acid of unsaturated fatty acid or a metal salt thereof in a large-diameter diene-based rubber latex polymerization step and an ABS graft polymerization step, stability of polymerization is increased and the amount of gases (TVOC) generated on a resin surface in a high-temperature thermomolding process, such as extrusion or injection-molding, is reduced, whereby surface roughness of an ABS-based injection-molded article is finally improved and surface gloss and sharpness are improved.

In addition, in accordance with the present invention, surface characteristics of an ABS-based injection-molded article are improved, and productivity of an ABS-based resin composition is concomitantly increased due to increased stability of a latex generated by polymerization.

BEST MODE

The present inventors observed that gases generated on a resin surface affect the roughness of a resin surface in a high-temperature extrusion or injection-molding process. Accordingly, the present inventors analyzed substances causing gas generation. As a result, it was discovered that the gas generation is caused by an emulsifier, unreacted monomers, oligomers, and the like remaining after diene-based rubber latex polymerization and ABS graft polymerization.

Accordingly, the present inventors confirmed that, by using a multimeric acid of unsaturated fatty acid or a metal salt thereof, which is not easily vaporized in a high-temperature extrusion or injection-molding process due to a high molecular weight thereof, as an emulsifier during diene-based rubber latex polymerization and ABS graft polymerization, stability of polymerization may be secured and a gas generation amount (TVOC) in an injection-molding process may be reduced, and thus, the quality, such as gloss or sharpness, of a final article is improved. On the basis of this finding, the present inventors have been more intensively engaged in research, thereby completing the present invention.

The method of preparing an ABS-based resin composition of the present invention may include the following steps:

a) A step of polymerizing 100 parts by weight of a conjugated diene based monomer, 0.5 to 5 parts by weight of an emulsifier, and 0.01 to 6 parts by weight of a water-soluble polymerization initiator;

b) a step of adding 0.01 to 5 parts by weight of an emulsifier thereto when a polymerization conversion rate is 60 to 85%, after step a);

c) a step of terminating polymerization when a polymerization conversion rate is 90 to 99% to obtain a large-diameter diene-based rubber latex;

d) a step of graft-polymerizing 100 parts by weight of a monomer mixture including 40 to 70% by weight (based on solid) of the large-diameter diene-based rubber latex, 15 to 35% by weight of an aromatic vinyl monomer, and 5 to 25% by weight of a vinyl cyan monomer with 0.01 to 3 parts by weight of an emulsifier, 0.01 to 3 parts by weight of an initiator, and 0.001 to 1 parts by weight of an oxidation-reduction catalyst;

e) a step of terminating polymerization when a conversion rate of the graft polymerization is 90 to 99% to obtain an ABS-based graft copolymer; and f) a step of mixing the ABS-based graft copolymer and an aromatic vinyl monomer-vinyl cyan monomer copolymer to prepare an ABS-based resin composition.

In the present disclosure, the polymerization conversion rate may be obtained by calculating according to Mathematical Equation 1 below after drying 1.5 g of a prepared latex in a 150° C. hot air dryer for 15 minutes and then measuring the weight of the dried latex to find a total solids content (TSG):

Polymerization conversion rate (%)=Total solid content (TSC)×(Weight of sum of added monomers and supplementary materials)/100−(Weight of added supplementary materials except for monomers)     [Mathematical Equation 1]

The present invention is characterized in that a multimeric acid of unsaturated fatty acid or a metal salt thereof is included as an emulsifier to improve surface characteristics of an ABS-based injection-molded article in steps a) and d), and an ABS-based resin composition prepared using the emulsifier has a surface gloss (45°) of 90 or more.

When the multimeric acid of unsaturated fatty acid or the metal salt thereof is included as an emulsifier in diene-based rubber latex polymerization and ABS graft polymerization, stability of polymerization may be secured, and the amount of gases (TVOC) generated on a resin surface may be reduced compared to conventional emulsifiers due to a characteristic that the multimeric acid of unsaturated fatty acid or the metal salt thereof is not easily vaporized during a high-temperature thermomolding process due to a high molecular weight thereof. Accordingly, a surface gloss (45°) of 90 or more may be accomplished.

In addition, for the same reason as above, the ABS-based resin composition prepared according to the method of the present invention has a reflection haze of 2 or less.

In the present disclosure, reflection haze may be measured according to a standard measurement method, ASTM E430, and a gloss (45°) may be measured according to a standard measurement method, ASTM D528.

In the present invention, the multimeric acid of unsaturated fatty acid refers to a polyvalent carboxylic acid obtained by polymerizing two or more unsaturated fatty acids, and the unsaturated fatty acid includes straight-chain, branched-chain, cyclic, or complex cyclic unsaturated fatty acid, or a derivative thereof.

In the present disclosure, the expression "derivative" refers to a compound formed by substituting one or more hydrogens of an original compound with an alkyl group, a halogen group, or a hydroxyl group.

In the present disclosure, the expression "complex cyclic" refers to a structure including at least two or more saturated or unsaturated cycloalkyl groups having 5 to 15 carbon atoms.

In an embodiment, the emulsifier of step a) and the emulsifier of step d) may include a straight-chain, branched-chain, or cyclic unsaturated fatty acid having 8 to carbon atoms or a metal salt thereof. Accordingly, polymerization stability during diene-based rubber latex polymerization and ABS graft polymerization may be increased and surface characteristics, such as gloss and sharpness, of an ABS-based injection-molded article may be improved.

In an embodiment, the emulsifiers of steps a) and d) may include a dimer acid of unsaturated fatty acid or a metal salt thereof. Accordingly, polymerization stability during diene-based rubber latex polymerization and ABS graft polymerization may be increased and surface characteristics, such as gloss and sharpness, of an ABS-based injection-molded article may be improved.

In an embodiment, the emulsifiers of steps a) and d) may include at least one dimer acid selected from the group consisting of compounds represented by Formulas 1 to 6 below or a metal salt thereof. Accordingly, polymerization stability during diene-based rubber latex polymerization and ABS graft polymerization may be increased and surface characteristics, such as gloss and sharpness, of an ABS-based injection-molded article may be improved.

[Formula 1]

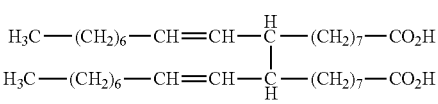

-continued

[Formula 2]
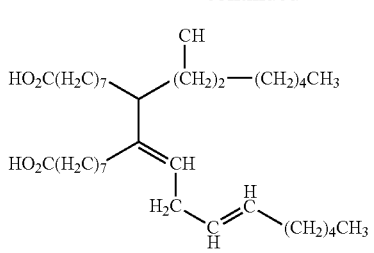

[Formula 3]
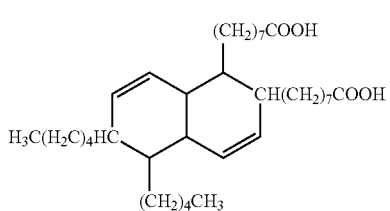

[Formula 4]
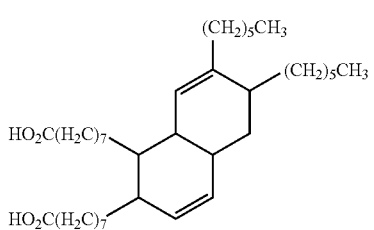

[Formula 5]
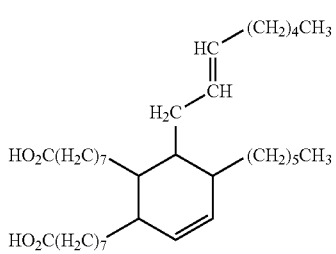

[Formula 6]
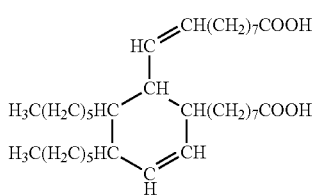

More particularly, the emulsifiers of steps a) and d) may include a dimer acid derived from a compound selected from the group including 3-octenoic acid, 10-undecenoic acid, oleic acid, linoleic acid, elaidic acid, palmitoleic acid, linolenic acid, tall oil fatty acid as a mixture with unsaturated carboxylic acid, soybean oil fatty acid, palm oil fatty acid, beef tallow fatty acid, lard fatty acid, tallow fatty acid, rice bran oil fatty acid, flaxseed oil fatty acid, or a metal salt. However, these substances are only provided as examples, and it should be noted that the scope of the present invention is not limited thereto.

In an embodiment, the emulsifiers of steps a) and d) may include an alkali metal salt of a multimeric acid of unsaturated fatty acid, or an alkali earth metal salt. Accordingly, surface characteristics of an ABS-based injection-molded article are improved.

In particular, the alkali metal salt may be a sodium salt or a potassium salt, and the alkali earth metal salt may be a magnesium salt or a calcium salt. However, it should be noted that the present invention is not limited thereto.

In an embodiment, the emulsifiers of steps a) and d) may include an alkali metal salt of a polybasic acid, formed by adding a hydroxide of an alkali metal, such as NaOH or KOH, to the multimeric acid of the unsaturated fatty acid to substitute a hydrogen of carboxylic acid with an alkali metal.

In another embodiment, the emulsifiers of steps a) and d) may include a compound prepared by adding a metal salt, such as a calcium salt or a magnesium salt, to a multimeric acid of unsaturated fatty acid or an alkali metal salt of the multimeric acid, but it should be noted that the present invention is not limited thereto.

In addition, the emulsifier of step a) may be the same as or different from that of step d). The emulsifiers of steps a) and d) may each independently use one compound selected from the aforementioned unsaturated fatty acid multimeric acids or metal salts thereof, or a mixture of two or more compounds thereof.

Hereinafter, each step of a method of preparing the ABS-based resin composition allowing production of an ABS-based injection-molded article having improved surface characteristics due to inclusion of the novel emulsifier is described.

a) Step of polymerizing conjugated diene based monomer, emulsifier, and water-soluble polymerization initiator:

The conjugated diene based monomer may include one or more compounds selected from the group consisting of 1,3-butadiene, isoprene, 2-chloro-1,3-butadiene and chloroprene. In this case, a derivative thereof may be used.

In the present disclosure, the expression "derivative" refers to a compound prepared by substituting one or two hydrogen atoms of an original compound with an alkyl group, a halogen group, or a hydroxyl group.

The emulsifier of step a) includes the multimeric acid of unsaturated fatty acid or the salt thereof described above. The multimeric acid of unsaturated fatty acid or the salt thereof may be used in an amount of 0.5 to 5 parts by weight, 0.8 to 4 parts by weight, 1.0 to 3 parts by weight or 1.0 to 2 parts by weight based on 100 parts by weight of the conjugated diene based monomer. Within this range, stability of polymerization may be secured, the content of a remaining emulsifier after polymerization is low, and a diene-based rubber latex having a small coagulum content may be prepared. In addition, since the content of a remaining emulsifier and the content of a coagulum are decreased, surface characteristics and productivity of a final ABS-based injection-molded article may be improved.

In an embodiment of the present invention, the emulsifier of step a) may be mixed with at least one secondary emulsifier selected from the group consisting of alkyl aryl sulfonate, alkali metal alkyl sulfate, sulfonated alkyl ester, and metal salts of unsaturated fatty acid based on 100% by weight of the emulsifier(s).

When the secondary emulsifier is mixed in step a), the secondary emulsifier is preferably used in an amount of 20 to 80% by weight, 30 to 70% by weight, 40 to 60% by weight or 25 to 50% by weight based on 100% by weight of the emulsifier of step a). Within the range, a coagulum content in a latex prepared by polymerization is low and the amount of gases (TVOC) generated on a surface of a resin during a high-temperature thermomolding process is reduced. Accordingly, surface characteristics, such as surface gloss and sharpness, of an ABS-based injection-molded article are improved.

In step a), the water-soluble polymerization initiator may be, for example, one or more selected from the group consisting of potassium persulfate, sodium persulfate and ammonium persulfate.

In step a), the water-soluble polymerization initiator is preferably used in an amount of 0.01 to 6 parts by weight, 0.05 to 4 parts by weight, 0.1 to 2 parts by weight, or 0.1 to 1 parts by weight based on 100 parts by weight of the conjugated diene based monomer. Within this range, excessive reaction of monomers may be prevented and a large-diameter rubber latex having a uniform size may be prepared.

In a particular embodiment, step a) may include a-1) a step of polymerizing 45 to 90 parts by weight of 100 parts by weight of the conjugated diene based monomer, 0.5 to 5 parts by weight of an emulsifier, and 0.01 to 3 parts by weight of a water-soluble polymerization initiator; and a-2) a step of adding 10 to 55 parts by weight of the conjugated diene based monomer and 0.01 to 3 parts by weight of a water-soluble polymerization initiator thereto when a polymerization conversion rate is 25 to 55%, after step a-1).

When the conjugated diene based monomer and the water-soluble polymerization initiator are added at an initial reaction stage and at a polymerization conversion rate of 25 to 55% as described above, excessive reaction of monomers may be prevented and a large-diameter rubber latex having a uniform size may be prepared.

In step a-1), the conjugated diene based monomer are preferably added in an amount of 45 to 90 parts by weight, 55 to 90 parts by weight, 65 to 90 parts by weight, or 75 to 90 parts by weight of 100 parts by weight. Accordingly, a proper number of base particles is formed at an initial reaction stage, whereby the diameters of base particles may be rapidly increased. In addition, a latex having a desired average particle diameter may be prepared.

In step a-1), the water-soluble polymerization initiator is preferably used in an amount of 0.01 to 3 parts by weight based on 100 parts by weight of the conjugated diene based monomer. Within this range, excessive reaction of monomers does not occur, whereby it is easy to control heat. In addition, a latex having a desired particle diameter may be prepared.

In step a-2), the remainder, 10 to 55 parts by weight, 10 to 45 parts by weight, 10 to 35 parts by weight, or 10 to 25 parts by weight of the conjugated diene based monomer are preferably added when a conversion rate of the polymerization is 25 to 55%, 30 to 50%, or 35 to 45%. Within this range, a large-diameter rubber latex having a uniform size may be rapidly prepared.

In addition, preferably, the conjugated diene based monomer added in step a-2) is continuously added from an addition initiation time point until a conversion rate reaches 60 to 85%, 65 to 80% or 70 to 80%. Accordingly, the content of unreacted monomers present in reactants may be minimized to prevent side reactions, and a large-diameter rubber latex having a uniform size may be prepared.

In the present disclosure, "continuously added" includes a case in which a compound, which is added for reaction, is continuously added or added dropwise for a predetermined time, 1 minute to 2 hours, 10 minutes to 1 hour, or 20 to 50 minutes, without stopping, or a predetermined amount of the compound is added in two stages or more, five stages or more, or 5 to 20 stages.

In an embodiment, "continuously added" in step a-2) may refer to a case in which the conjugated diene based monomer used in step a-2) is split-added over two to five steps.

In another embodiment, "continuously added" in step a-2) may refer to a case in which the used conjugated diene based monomer is added from a polymerization conversion rate of 25 to 55% to a polymerization conversion rate of 60 to 85% at a rate of 0.01 to 0.2 g/min.

In step a-2), the water-soluble polymerization initiator is preferably added in an amount of 0.01 to 3 parts by weight, 0.1 to 3 parts by weight, 0.1 to 2 parts by weight, or 0.1 to 1 parts by weight. Within this range, a large-diameter rubber latex having a uniform average particle diameter may be prepared.

b) Step of adding 0.01 to 5 parts by weight of emulsifier when polymerization conversion rate is 60 to 85%:

The emulsifier of step b) may be one or more selected from the group consisting of alkyl aryl sulfonate, alkali metal alkyl sulfate, sulfonated alkyl ester, and a metal salt of unsaturated fatty acid.

The emulsifier of step b) is preferably added in an amount of 0.01 to 3 parts by weight, 0.1 to 3 parts by weight, 0.1 to 2 parts by weight, or 0.1 to 1 parts by weight based on 100 parts by weight of the conjugated diene based monomer when a polymerization conversion rate is 60 to 85%, 65 to 80%, or 70 to 80%.

When the emulsifier of step b) is added within the range, stability of polymerization is improved, whereby a coagulum content in a latex is reduced and a gas generation amount (TVOC) during a high-temperature injection-molding process is reduced. Accordingly, quality and productivity of an ABS-based molded article are improved.

c) Step of terminating polymerization when polymerization conversion rate is 90 to 99% to obtain large-diameter diene-based rubber latex:

In step c), for example, polymerization is preferably terminated when a polymerization conversion rate is 90 to 99%, 93 to 99%, 95 to 99% or 97 to 99%. Within this range, a large-diameter rubber latex having a high polymerization degree and uniform particle distribution may be prepared, which ultimately contributes to improvement in quality of an ABS-based resin.

The large-diameter diene-based rubber latex obtained in step c) preferably has an average particle diameter of 2700 to 3300 Å or 2900 to 3200 Å because properties of an ABS-based resin greatly depend upon an average particle diameter of a diene-based rubber latex. An ABS-based resin composition prepared from a rubber latex having an average particle diameter within the range has superior mechanical characteristics, surface characteristics, and property balance.

In the present disclosure, an average particle diameter of latex may be measured by means of a Nicomp 370HPL according to a dynamic laser light scattering method after mixing 1 g of latex with 100 g of distilled water.

In addition, a coagulum content in the large-diameter diene-based rubber latex obtained in step c) may be 0.1% by weight or less, 0.08% by weight or less, or 0.05% by weight or less based on 100 parts by weight of the latex. An ABS-based resin prepared from a diene-based rubber latex having a coagulum content within this range has superior mechanical properties, surface characteristics, and property balance.

d) Step of graft polymerizing large-diameter diene-based rubber latex with aromatic vinyl monomer and vinyl cyan monomer:

In step d), 100 parts by weight of a monomer mixture including the large-diameter diene-based rubber latex, an aromatic vinyl monomer, and a vinyl cyan monomer may be graft-polymerized with 0.01 to 3 parts by weight of an emulsifier, 0.01 to 3 parts by weight of an initiator, and 0.001 to 1 parts by weight of an oxidation-reduction catalyst. Here, the emulsifier includes a multimeric acid of unsaturated fatty acid or a metal salt thereof.

In an embodiment, the monomer mixture may include 40 to 70% by weight (based on solid) of the large-diameter diene-based rubber latex, 15 to 35% by weight of the aromatic vinyl monomer, and 5 to 25% by weight of the vinyl cyan monomer. Within this range, an ABS-based resin composition has superior mechanical properties and property balance.

In another embodiment, the monomer mixture may include 50 to 65% by weight (based on solid) of the large-diameter diene-based rubber latex, 20 to 35% by weight of the aromatic vinyl monomer, and 5 to 15% by weight of the vinyl cyan monomer. Within this range, a prepared ABS-based resin composition has superior mechanical properties and satisfactory property balance.

In still another embodiment, the monomer mixture may include 55 to 65% by weight (based on solid) of the large-diameter diene-based rubber latex, 25 to 35% by weight of the aromatic vinyl monomer, and 5 to 15% by weight of the vinyl cyan monomer. An ABS-based resin prepared using the monomers mixed within this range has superior mechanical properties and satisfactory property balance.

The aromatic vinyl monomer may include one or more selected from the group consisting of styrene, α-methyl styrene, α-ethyl styrene, p-methyl styrene, o-t-butyl styrene, bromostyrene, chlorostyrene, trichlorostyrene, and derivatives thereof, but it should be noted that the present invention is not limited thereto.

The vinyl cyan monomer may include one or more selected from the group consisting of acrylonitrile, methacrylonitrile and derivatives thereof, but the present invention is not limited thereto.

In the present disclosure, "derivative" may refer to a compound formed by substituting one or more hydrogens of an original compound with a halogen group, an alkyl group, or a hydroxyl group.

The emulsifier of step d) includes the multimeric acid of unsaturated fatty acid or the metal salt thereof described above. The emulsifier is preferably used in an amount of 0.01 to 3 parts by weight, 0.05 to 2 parts by weight, 0.1 to 1.5 parts by weight, or 0.3 to 1.0 parts by weight based on 100 parts by weight of the monomer mixture. Within this range, surface characteristics, such as gloss and sharpness, of a finally prepared ABS-based resin are improved.

In another embodiment, the emulsifier of step d) may be mixed with 20 to 80% by weight, 30 to 70% by weight, 40 to 60% by weight, or 25 to 50% by weight of at least one secondary emulsifier selected from the group consisting of alkyl aryl sulfonate, alkali metal alkyl sulfate, sulfonated alkyl ester, and a metal salt of unsaturated fatty acid based on 100% by weight of the emulsifier of step d).

In step d), the secondary emulsifier is mixed within the aforementioned range, a coagulum content in a prepared latex is low and the amount of gases (TVOC) generated on a resin surface during high-temperature thermomolding is reduced. Accordingly, surface characteristics, such as surface gloss and sharpness, of an ABS-based injection-molded article are improved.

The initiator of step d) may be a water-soluble initiator or a liposoluble initiator. The water-soluble initiator may be, for example, sodium persulfate, potassium persulfate, ammonium persulfate, or the like, and the liposoluble initiator may be, for example, cumene hydroperoxide, diisopropyl benzene hydroperoxide, tertiary butyl hydroperoxide, paramenthane hydroperoxide, benzoyl peroxide, or the like. In addition, it should be noted that the water-soluble initiator may be mixed with the liposoluble initiator as needed.

In step d), the initiator may be used in an amount of 0.01 to 3 parts by weight, 0.01 to 2 parts by weight, 0.01 to 1 parts by weight, or 0.05 to 0.25 parts by weight based on 100 parts by weight of the monomer mixture. Within this range, the content of unreacted monomers is small, whereby surface gloss and sharpness of an ABS-based resin composition are improved.

In step d), the oxidation-reduction catalyst may include, for example, one or more selected from the group consisting of sodium formaldehyde sulfoxylate, sodium ethylene diamine tetraacetate, ferrous sulfate, dextrose, pyrrole sodium phosphate, and sodium sulfite.

In step d), the oxidation-reduction catalyst may be used in an amount of 0.001 to 1 parts by weight, 0.01 to 0.5 parts by weight, or 0.1 to 0.25 parts by weight. Within this range, the content of unreacted monomers is reduced, whereby productivity of an ABS-based resin composition is increased and surface gloss and sharpness of a resin are improved.

In a particular embodiment, step d) may include the following steps:

d-1) A first graft polymerization step of reacting 100 parts by weight of the monomer mixture with 0.01 to 3 parts by weight of an emulsifier, 0.01 to 2 parts by weight of an initiator, and 0.0001 to 0.4 parts by weight of an oxidation-reduction catalyst at 50 to 90 r for 2 to 5 hours;

d-2) a step of adding 0.01 to 1 parts by weight of an initiator and 0.001 to 0.6 parts by weight of an oxidation-reduction catalyst thereto, after the first graft polymerization step; and d-3) a second graft polymerization of, after the adding of step d-2), elevating temperature up to 60 to 100° C. (higher than temperature in step d-1)) at a temperature elevation rate of 10 to 15° C./hour and allowing reaction.

In step d-1), the initiator is preferably used in an amount of 0.01 to 2 parts by weight, 0.05 to 1 parts by weight, or 0.05 to 0.5 parts by weight and the oxidation-reduction catalyst is preferably used in an amount of 0.001 to 0.4 parts by weight, 0.005 to 0.2 parts by weight, or 0.01 to 0.2 parts by weight, so as to perform first graft polymerization of the monomer mixture. When the first addition of the initiator and the oxidation-reduction catalyst is performed, excessive reaction does not occur, it is easy to control heat, and an ABS-based graft copolymer having a high graft rate may be prepared.

In step d-1), preferably, the initiator and the oxidation-reduction catalyst are first added and then are subjected to first graft polymerization by reacting at 50 to 90° C. or 60 to 80° C. for 2 to 5 hours or 3 to 4 hours because the initiator is activated under this condition and polymerization is initiated. In addition, when the first graft polymerization is performed under the reaction condition, excessive reaction is prevented and it is easy to control heat.

In step d-2), the initiator is added in an amount of 0.01 to 1 parts by weight, 0.01 to 0.5 parts by weight, or 0.01 to 0.1 parts by weight, and the oxidation-reduction catalyst is added in an amount of 0.001 to 0.6 parts by weight, 0.01 to 0.3 parts by weight, or 0.01 to 0.1 parts by weight. When the initiator and the oxidation-reduction catalyst are second-added within these ranges, the content of unreacted monomers contents is reduced, whereby productivity and quality of an ABS-based resin composition may be improved.

In step d-3), temperature is preferably elevated up to 60 to 100° C. or 70 to 90° C. (higher than temperature of step d-1)) at a temperature elevation rate of 10 to 15° C./hour or 10 to 13° C./hour to perform second graft polymerization, after completing the addition of step d-2). When the temperature of reactants is elevated under the conditions, reaction of unreacted monomers is further facilitated, whereby a high graft polymerization conversion rate may be accomplished within shorter time.

e) Step of terminating polymerization when conversion rate of graft polymerization is 90 to 99% to obtain ABS-based graft copolymer:

In step e), reaction is preferably terminated when a conversion rate of graft polymerization is 90 to 99%, 92 to 99% or 95 to 99%. Within this range, the content of unreacted monomers in a product is low and an ABS-based graft copolymer having a high graft rate may be prepared.

In addition, in step e), an ABS-based graft copolymer latex may be obtained in a powder form through general processes such as coagulation, washing, and drying.

In an embodiment, the ABS-based graft copolymer latex may be coagulated by adding an acid such as sulfuric acid thereto. Selectively, an antioxidant and/or a stabilizer may be further added, and washing, dehydration and drying may be performed after being coagulated at 70° C. or more, 80° C. or more, or 90° C. or more, whereby the ABS-based graft copolymer latex is obtained in a powder form. However, it should be noted that the present invention is not limited thereto.

f) Step of preparing ABS-based resin composition mixing ABS-based graft copolymer with aromatic vinyl monomer-vinyl cyan monomer copolymer:

The ABS-based graft copolymer, which has been prepared in a powder form through a general process, are mixed with an aromatic vinyl monomer-vinyl cyan monomer copolymer, thereby being prepared into an ABS-based resin composition. The prepared ABS-based resin composition may be used in manufacturing an ABS-based injection-molded article.

As the aromatic vinyl monomer-vinyl cyan monomer copolymer, the copolymer of the aromatic vinyl monomer and the vinyl cyan monomer of step d) may be used. In an embodiment, the aromatic vinyl monomer-vinyl cyan monomer copolymer may be a copolymer of a vinyl aromatic monomer, such as styrene, a-methyl styrene, and a vinyl cyan monomer, such as acrylonitrile, methacrylonitrile and ethacrylonitrile.

In an embodiment, the aromatic vinyl monomer-vinyl cyan monomer copolymer may be a copolymer including 50 to 80% by weight of an aromatic vinyl monomer and 20 to 50% by weight of a vinyl cyan monomer. In another embodiment, the aromatic vinyl monomer-vinyl cyan monomer copolymer may be a copolymer including 65 to 80% by weight of an aromatic vinyl monomer and 20 to 35% by weight of a vinyl cyan monomer. Within this range, an ABS-based injection-molded article having desired mechanical characteristics may be prepared.

The ABS-based resin composition prepared according to the method of the present invention has a gloss (45°) of 90 or more, 95 or more, 97 or more, or 98 or more.

The ABS-based resin composition prepared according to the present invention has a reflection haze of 2 or less, 1.5 or less, or 1.3 or less.

Other reaction conditions such as reaction pressure, a graft rate, and additives, such as an electrolyte and a molecular weight modifier, besides the above-described conditions are not specifically limited so long as they are within a range generally practiced in the technical field to which the present invention pertains, and may be suitably selected and carried out as needed.

Further, the ABS-based resin composition prepared according to the method is subjected to an injection-molding step, thereby being manufactured into an ABS-based injection-molded article.

In an embodiment, the method of manufacturing an ABS-based injection-molded article of the present invention may include a step of mixing 10 to 50% by weight of the ABS-based graft copolymer with 50 to 90% by weight of the aromatic vinyl monomer-vinyl cyan monomer copolymer and extruding the same, followed by injection-molding the same. When an ABS-based injection-molded article is manufactured through mixing within the range, superior surface characteristics and property balance are exhibited.

In another embodiment, the method of manufacturing an ABS-based injection-molded article of the present invention may include a step of mixing 20 to 40% by weight of the ABS-based graft copolymer with 60 to 80% by weight of the aromatic vinyl monomer-vinyl cyan monomer copolymer and extruding the same, followed by injection-molding the same. When an ABS-based injection-molded article is manufactured through mixing within the range, superior surface characteristics and property balance are exhibited.

In another embodiment, the method of manufacturing an ABS-based injection-molded article of the present invention may include a step of mixing 25 to 30% by weight of the ABS-based graft copolymer with 70 to 75% by weight of the aromatic vinyl monomer-vinyl cyan monomer copolymer and extruding the same, followed by injection-molding the same. When an ABS-based injection-molded article is manufactured through mixing within the range, superior surface characteristics and property balance are exhibited.

The extrusion may be carried out, for example, under conditions of 200 to 240° C. and 140 to 190 rpm, or 200 to 220° C. and 150 to 180 rpm. Within this range, an ABS-based injection-molded article having desired mechanical characteristics may be manufactured.

The injection-molding may be carried out, for example, under conditions of 200 to 230° C. and 70 to 90 bar, or 200 to 220° C. and 70 to 80 bar. Within this range, an ABS-based injection-molded article having desired mechanical characteristics may be manufactured.

In addition, during the injection-molding, a gas generation amount (TVOC) is preferably 4,500 ppm or less, 3,000 ppm or less, 2,500 ppm or less, 2,000 ppm or less, or 1,500 ppm or less. Within this range, surface gloss, sharpness, and the like of the injection-molded article are improved.

In the present disclosure, the gas generation amount (TVOC) may be calculated by measuring the amount of VOC generated from 1 g of a resin composition at 200 to 300 r for one hour by gas chromatography.

Other conditions not explicitly described in the method of manufacturing an ABS-based injection-molded article are not specifically limited so long as the conditions are within a range usually practiced in the technical field to which the present invention pertains, and may be suitably selected as needed.

Now, the present invention will be described in more detail with reference to the following preferred examples. However, these examples are provided for illustrative purposes only. Those skilled in the art will appreciate that various modifications, additions and substitutions are possible, without departing from the scope and spirit of the invention. Therefore, it is obvious that the modifications, additions and substitutions are within the scope of the present invention.

EXAMPLE

Example 1

1. Preparation of Large-Diameter Diene-Based Rubber Latex 55 parts by weight of deionized water, 85 parts by weight of 100 parts by weight of 1,3-butadiene as a monomer, 1.5 parts by weight of potassium dimer acid salt (Cas No. 67701-19-3) as an emulsifier, 0.15 parts by weight of potassium carbonate ($K_2CO_3$) as an electrolyte, 0.3 parts by weight of tertiary dodecyl mercaptan (TDDM) as a molecular weight regulator, and 0.3 parts by weight of potassium persulfate as an initiator were fed into a polymerization reactor (autoclave) filled with nitrogen batchwise, and polymerization was carried out at a reaction temperature of 70° C. until a polymerization conversion rate reached 35 to 45%.

Subsequently, 0.3 parts by weight of potassium persulfate were added thereto batchwise, and the remainder of 1,3-butadiene was continuously added until a polymerization conversion rate reached 70 to 80%, followed by adding 0.3 parts by weight of rosin acid soap thereto batchwise. Reaction was terminated when a conversion rate was 93%.

2. Preparation of ABS-Based Graft Copolymer 60 parts by weight of the large-diameter diene-based rubber latex (average particle diameter: 3200 Å, and coagulum content: 0.04% by weight), 100 parts by weight of deionized water, a mixture including 10 parts by weight of acrylonitrile, 30 parts by weight of styrene, 25 parts by weight of deionized water, 0.12 parts by weight of t-butyl hydroperoxide, 0.7 parts by weight of potassium dimer acid salt (Cas No. 67701-19-3), and 0.35 parts by weight of tertiary dodecyl mercaptan mixed in a separated mixer, 0.054 parts by weight of dextrose, 0.004 parts by weight of sodium pyrophosphate, and 0.002 parts by weight of ferrous sulfate were added at 70° C. over a period of three hours to a polymerization reactor filled with nitrogen.

After completing the feeding, 0.05 parts by weight of dextrose, 0.03 parts by weight of sodium pyrophosphate, 0.001 parts by weight of ferrous sulfate, and 0.05 parts by weight of t-butyl hydroperoxide were added to the polymerization reactor batchwise, and temperature was elevated up to 80° C. for a period of one hour, followed by terminating reaction. As a result, an ABS-based graft copolymer latex was prepared. Here, a polymerization conversion rate was 97%.

3. Manufacture of ABS-Based Injection-Molded Article

The prepared ABS-based graft copolymer latex was solidified with an aqueous sulfuric acid solution and washed and dried, thereby obtaining a powder. 27.5 parts by weight of the obtained powder and 72.5 parts by weight of SAN (product name: 92HR, including 27% by weight of acrylonitrile and 73% by weight of styrene, manufactured by LG chemistry) were mixed in a mixture, thereby preparing an ABS-based resin composition.

Subsequently, the resin composition was pelletized using an extruder (extrusion temperature: 210° C., 160 rpm), and then a specimen for measuring properties was obtained using an injection machine (injection-molding temperature: 210° C., injection-molding pressure: 80 bar, Engel ES 200/45 HL-Pro Series).

Example 2

An experiment was carried out in the same manner as in Example 1, except that, instead of potassium dimer acid salt, a mixture of potassium dimer acid salt and rosin acid soap mixed in a weight ratio of 50:50 was used.

Example 3

An experiment was carried out in the same manner as in Example 1, except that, instead of potassium dimer acid salt, a mixture of potassium dimer acid salt and C16 to C18 saponified fatty acid mixed in a weight ratio of 50:50 was used.

Example 4

An experiment was carried out in the same manner as in Example 1, except that, instead of potassium dimer acid salt, a mixture of potassium dimer acid salt, rosin acid soap, and C16 to C18 saponified fatty acid mixed in a weight ratio of 50:25:25 was used.

Comparative Example 1

An experiment was carried out in the same manner as in Example 1, except that, instead of potassium dimer acid salt, C16 to C18 saponified fatty acid was used.

Test Example

Properties of a sample prepared according to each of Examples 1 to 4 and Comparative Example 1 were measured according to the following methods. Results are summarized in Table 1 below.

Gas Generation Amount (TVOC) (ppm)

A total amount of volatile organic compounds (VOC) generated from 1 g of the ABS-based resin composition prepared in each of the examples and the comparative example was analyzed at 250° C. for one hour using HS-GC/MSD.

Sharpness (Reflection Haze)

Using gloss specimens, sharpness was measured by adding a gloss value between 17 to 19° and 21 to 23° according to a standard measurement method, ASTM E430.

Gloss (45°)

Gloss of specimens was measured at 45° according to ASTM D528.

Coagulum Content (g/100 g)

The weight of a coagulum generated in a reaction tank, a total weight of rubber, and the weight of monomers were measured, and a solid coagulum content in an ABS-based graft copolymer latex was calculated according to Mathematical Equation 2 below.

Coagulum content=Weight of coagulum generated inside reaction tank (g)/Total weight of rubber and weight of monomers (100 g)    [Mathematical Equation 2]

TABLE 1

|  | Example 1 | Example 2 | Example 3 | Example 4 | Comparative Example 1 |
|---|---|---|---|---|---|
| Gas generation amount [ppm] | 1,400 | 1,800 | 2,600 | 2,100 | 4,800 |

TABLE 1-continued

| | Example 1 | Example 2 | Example 3 | Example 4 | Comparative Example 1 |
|---|---|---|---|---|---|
| Sharpness | 1.1 | 1.2 | 1.4 | 1.3 | 2.7 |
| Gloss | 99.9 | 98.4 | 97.7 | 97.5 | 89.1 |
| Coagulum content in ABS latex [g/100 g] | 0.09 | 0.05 | 0.06 | 0.02 | 0.16 |

As shown in Table 1, it can be confirmed that, in the cases of Examples 1 to 4 in which a potassium dimer acid salt is included as an emulsifier in the diene-based rubber latex polymerization step and the ABS-based graft polymerization step to prepare an ABS-based resin composition, a gas generation amount (TVOC) is considerably small, compared to Comparative Example 1 in which the potassium dimer acid salt is not included. This result may be considered to be caused by the characteristic of potassium dimer acid salt that it is not easily vaporized due to a high molecular weight thereof, compared to a conventional emulsifier.

In addition, it can be confirmed that the ABS-based injection-molded article according to the present invention has a small gas generation amount (TVOC) as described above, and thus, has superior surface characteristics, such as a low reflection haze value and high gloss, compared to Comparative Example 1.

Further, it can be confirmed that a coagulum content in the ABS-based graft copolymer latex is lower in Examples 1 to 4 than Comparative Example 1, and is much lower in Examples 2 and 4 in which a mixture of potassium dimer acid salt and rosin acid soap was used as an emulsifier.

The invention claimed is:

1. A method of preparing an ABS-based resin composition, the method comprising:
  a) a step of polymerizing 100 parts by weight of a conjugated diene based monomer, 0.5 to 5 parts by weight of an emulsifier, and 0.01 to 6 parts by weight of a water-soluble polymerization initiator;
  b) a step of adding 0.01 to 5 parts by weight of an emulsifier thereto when a polymerization conversion rate is 60 to 85%, after step a);
  c) a step of terminating polymerization when a polymerization conversion rate is 90 to 99% to obtain a large-diameter diene-based rubber latex;
  d) a step of graft-polymerizing 100 parts by weight of a monomer mixture comprising 40 to 70% by weight (based on solid) of the large-diameter diene-based rubber latex, 15 to 35% by weight of an aromatic vinyl monomer, and 5 to 25% by weight of a vinyl cyan monomer with 0.01 to 3 parts by weight of an emulsifier, 0.01 to 3 parts by weight of an initiator, and 0.001 to 1 parts by weight of an oxidation-reduction catalyst;
  e) a step of terminating polymerization when a conversion rate of the graft polymerization is 90 to 99% to obtain an ABS-based graft copolymer; and
  f) a step of mixing the ABS-based graft copolymer and an aromatic vinyl monomer-vinyl cyan monomer copolymer to prepare an ABS-based resin composition,
  wherein the emulsifiers of steps a) and d) comprise a multimeric acid of unsaturated fatty acid or a metal salt thereof and the ABS-based resin composition has a gloss) (45°) of 90 or more.

2. The method according to claim 1, wherein the ABS-based resin composition has a reflection haze of 2 or less.

3. The method according to claim 1, wherein the unsaturated fatty acid is a straight-chain, branched-chain, or cyclic unsaturated fatty acid having 8 to 22 carbon atoms.

4. The method according to claim 1, wherein the multimeric acid is a dimer acid.

5. The method according to claim 4, wherein the dimer acid is one or more selected from the group consisting of compounds represented by Formulas 1 to 6 below:

[Formula 1]
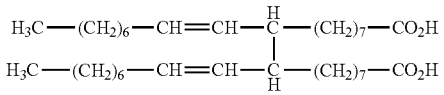

[Formula 2]
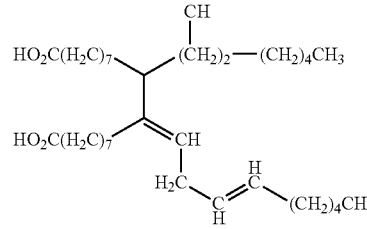

[Formula 3]
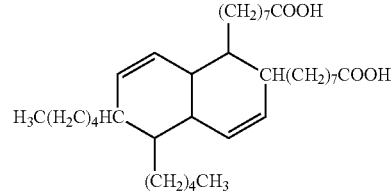

[Formula 4]
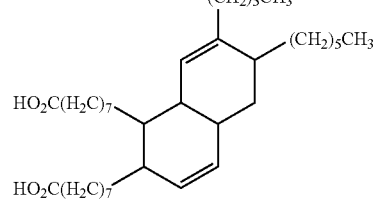

[Formula 5]
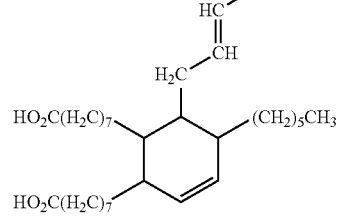

[Formula 6]
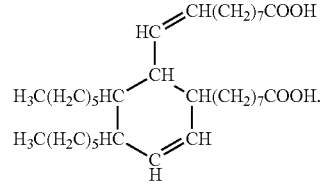

6. A method of manufacturing an ABS-based injection-molded article, the method comprising a step of injection-molding the ABS-based resin composition prepared according to the method according to 5.

7. The method according to claim 1, wherein the metal salt is an alkali metal salt or an alkali earth metal salt.

8. The method according to claim 7, wherein the alkali metal salt is a sodium salt or a potassium salt.

9. The method according to claim 7, wherein the alkali earth metal salt is a magnesium salt or a calcium salt.

10. The method according to claim 1, wherein the emulsifier of step a), the emulsifier of step d), or the both emulsifiers comprise 20 to 80% by weight of at least one secondary emulsifier selected from the group consisting of alkyl aryl sulfonate, alkali metal alkyl sulfate, sulfonated alkyl ester, and metal salts of unsaturated fatty acid based on 100% by weight of the emulsifier(s).

11. The method according to claim 1, wherein step a) comprises: a-1) a step of polymerizing 45 to 90 parts by weight of 100 parts by weight of the conjugated diene based monomer, 0.5 to 5 parts by weight of an emulsifier, and 0.01 to 3 parts by weight of a water-soluble polymerization initiator; and a-2) a step of adding 10 to 55 parts by weight of the conjugated diene based monomer and 0.01 to 3 parts by weight of a water-soluble polymerization initiator thereto when a polymerization conversion rate is 25 to 55%, after step a-1).

12. The method according to claim 11, wherein, in step a-2), 10 to 55 parts by weight of the conjugated diene based monomer are continuously added until a polymerization conversion rate reaches 60 to 85%.

13. The method according to claim 1, wherein the large-diameter diene-based rubber latex has an average particle diameter of 2700 to 3300 Å and a coagulum content of 0.1% by weight or less.

14. The method according to claim 1, wherein step d) comprises: d-1) a first graft polymerization step of reacting 100 parts by weight of the monomer mixture with 0.01 to 3 parts by weight of an emulsifier, 0.01 to 2 parts by weight of an initiator, and 0.0001 to 0.4 parts by weight of an oxidation-reduction catalyst at 50 to 90° C. for 2 to 5 hours; d-2) a step of adding 0.01 to 1 parts by weight of an initiator and 0.001 to 0.6 parts by weight of an oxidation-reduction catalyst thereto, after the first graft polymerization step; and d-3) a second graft polymerization of, after the adding of step d-2), elevating temperature up to 60 to 100° C. (higher than temperature in step d-1)) at a temperature elevation rate of 10 to 15° C/hour and allowing reaction.

15. The method according to claim 1, wherein the ABS-based resin composition is used to manufacture an injection-molded article.

16. A method of manufacturing an ABS-based injection-molded article, the method comprising a step of injection-molding the ABS-based resin composition prepared according to the method according to claim 1.

17. The method according to claim 16, wherein, during the injection-molding, a gas generation amount (Total Volatile Organic Compounds, TVOC) is 4,500 ppm or less.

* * * * *